United States Patent [19]

McFarland

[11] Patent Number: 5,603,972
[45] Date of Patent: Feb. 18, 1997

[54] IRRADIATION METHOD AND APPARATUS

[76] Inventor: Archie R. McFarland, 84 High Country Rd., Herriman, Utah 84065

[21] Appl. No.: 436,742

[22] Filed: May 8, 1995

[51] Int. Cl.$^6$ .................................. A23L 3/00; A61L 2/00
[52] U.S. Cl. ........................ 426/240; 99/451; 250/492.3; 422/22; 426/521
[58] Field of Search ..................................... 426/237, 240, 426/521; 99/451; 422/22; 250/492.3

[56] References Cited

U.S. PATENT DOCUMENTS

| | | | |
|---|---|---|---|
| 2,456,909 | 12/1948 | Brasch | 426/240 |
| 2,963,369 | 12/1960 | Urbain | 426/240 |
| 3,567,462 | 3/1971 | Silverman et al. | 426/237 |
| 3,876,373 | 4/1975 | Glyptis | 426/237 |
| 5,366,746 | 11/1994 | Mendenhall | 426/521 |
| 5,482,726 | 1/1996 | Robinson, Jr. | 426/240 |

OTHER PUBLICATIONS

"Radiation Physical Chemistry", vol. 36, No. 3, pp. 661–665 entitled Use of a Linear Accelerator For Decontamination of Deboned Poultry Meat.

Titan Scan Systems entitled "Electron Beam Sterilization Systems".

Congressional Research Service, The Library of Congress entitled "Preservation of Food by Irradiation", Jun. 21, 1983.

*Primary Examiner*—George Yeung
*Attorney, Agent, or Firm*—Mallinckrodt & Mallinckrodt

[57] ABSTRACT

Material to be irradiated is passed through the irradiation zone of an ionizing electron beam diode accelerator in thin sheet form that is not more than about one-half an inch in thickness and preferably in close contact with the anode of such accelerator. The thin sheet may be flat or tubular, depending upon the type of accelerator utilized.

12 Claims, 5 Drawing Sheets

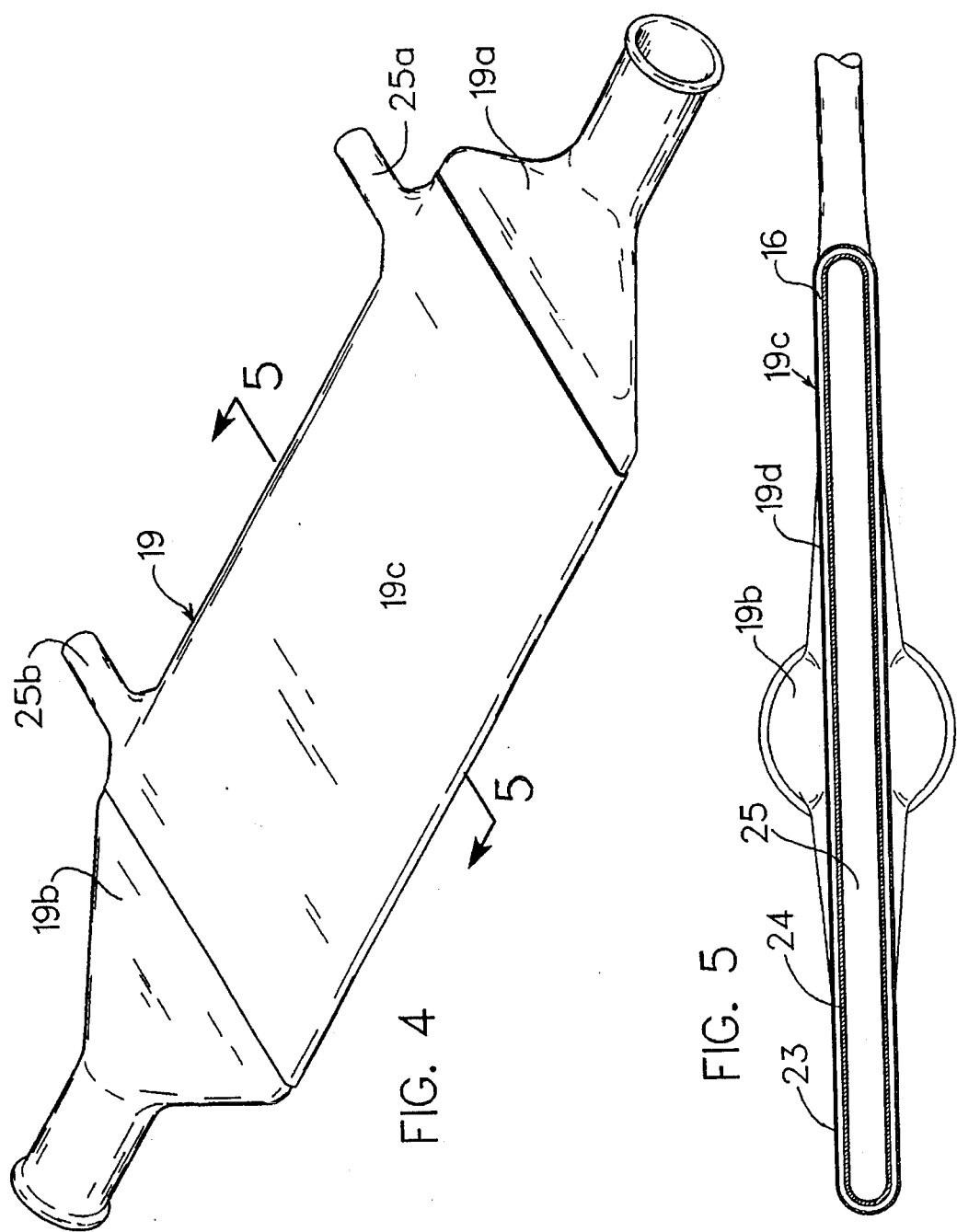

IRRADIATION METHOD AND APPARATUS

BACKGROUND OF THE INVENTION

1. Field

The invention is in the field of irradiating various materials, such as foods, particularly meat, with electrons to beneficially alter the characteristics of such materials, as for example to reduce or kill pathogens in foods.

2. State of the Art

The generation of high power electron beams for irradiating various materials has long been known and used both for possible military purposes and for civilian purposes. It has been used commercially for modifying polymers and for sterilizing medical products and hospital wastes. The presence of pathogens, such as E-coli or salmonella bacteria, in meat, and especially in massed particles of meat, such as extensively used by the fast food burger industry, has long been recognized and procedures undertaken largely on an experimental basis to rid such food items of the pathogens contained therein, or at least to considerably reduce the pathogen content thereof. The use of linear electron accelerators for the purpose has been suggested, and known equipment has been employed to a limited extent.

As early as December 1948, Brasch U. S. Pat. No. 2,456,909 disclosed that the exposure of various types of meat to high speed electrons in a series of repetitive pulses would sterilize meat and, if the meat was first frozen and if exposure to the electrons was done in the absence of air, changes in taste, odor, and appearance of the meat would be avoided. A later patent to Silverman et al., U.S. Pat. No. 3,567,462 of March 1971 discloses the use of ionizing radiation for extending the storage life of fresh animal tissue. However, a patent to Glyptis No. 3,876,373 of April 1975 mentions electron beam sterilization as prior art but rejects it for a variety of reasons, including alteration of taste and appearance of food to which the procedure is applied.

An account of a successful commercial operation in France, using a linear accelerator to eliminate pathogens by the irradiating of chicken meat that had been mechanically separated from bone particles, is contained in the scientific journal "Radiation Physical Chemistry" Vol. 36 No. 3 pp. 661–665 (1990). This was apparently the first application of radiation for sterilizing chicken meat on a commercial scale. There, mechanically deboned chicken meat was pressed into slabs and exposed to irradiation by a linear electron accelerator, first on one side of the slab and then, in a second run through the equipment, on the opposite side of the slab.

A very recent U.S. Pat. No. 5,366,746 of Nov. 22, 1994 to Von T. Mendenhall assigned to Utah State University discloses the use of electron beam radiation (EBR) at doses between about 1.0 to 20 Kgys applied to thermally pre-processed meat for sterilization and other purposes.

SUMMARY OF THE INVENTION

In the making of the present invention, a principal objective was to provide improved method and apparatus for treating materials by ionizing irradiation utilizing electron beams.

In accomplishing this objective, a feature of the invention is the passing of the material through an irradiating zone in thin sheet formation and desirably in contact with the anode terminal of an electron beam generator, which generator has a cathode terminal operatively associated with the anode terminal. The thin sheet of material to be irradiated has thickness of about one-half an inch or preferably less, i.e. from 0.065 to 0.500 of inch. In accordance with the invention, the material to be irradiated is placed in (or is already in) sheet form that is thin (about one-half an inch or less) relative to shapes or slabs normally subjected to electron beam radiation and is passed through an irradiation zone in contact with the anode of an electron beam generator. This is believed to enable use of less powerful radiation than has heretofore been thought necessary. Moreover, by substantially eliminating the customary air gap between the material being irradiated and the anode of the electron beam generator, the formation of ozone is minimized during irradiation of the material being treated.

The applied dose of electron radiation can be as low as 1.5 kilograys (Kgs), or even lower, within an energy range of from about 0.5 to about 2.0 MeV to penetrate and pass through the thin sheet of material, the thickness of which is typically in the range of about 0.1 to about 6 millimeters but not more than about one-half inch (12.5 millimeters).

Control of the dose, in the instance of meat being the material irradiated, is effected by monitoring small particles of bone normally present in the meat, which act as a dosimeter for determining the extent to which the meat has been irradiated (see pages 137 and 138 of the text "Food Irradiation" edited by Stuart Thorne of the Department of Food Service, King's College London, London, UK, published by Elsevier Applied Science, London and New York).

THE DRAWINGS

The best modes presently contemplated for carrying out the invention are illustrated in the accompanying drawings, in which:

FIG. 1 is a largely schematic, pictorial view of a preferred way of carrying out the method of the invention on a continuous, commercial basis utilizing a linear electron beam accelerator as the electron beam generator with respect to a continuous, thin, sheet strip of frozen ground meat;

FIG. 2, a longitudinal vertical section taken along the line 2—2 of FIG. 1;

FIG. 2A, a portion of FIG. 2 broken out and drawn to a considerably larger scale;

FIG. 3, a somewhat schematic, perspective view of an embodiment of apparatus for irradiating a ground food material, portions of outer walls thereof being broken away to show otherwise hidden internal structure;

FIG. 4, a perspective view looking down on the manifold portion of the embodiment of FIG. 3 and drawn to a considerably larger scale;

FIG. 5, a transverse vertical section taken on the line 5—5 of FIG. 4 and drawn to a still larger scale; and FIG. 6, a fragmentary view in perspective of a radial diode electron beam accelerator wherein the thin sheet being irradiated is tubular and passes in contact with a cylindrical anode of the accelerator.

DETAILED DESCRIPTION OF THE ILLUSTRATED EMBODIMENTS

Figure 1:
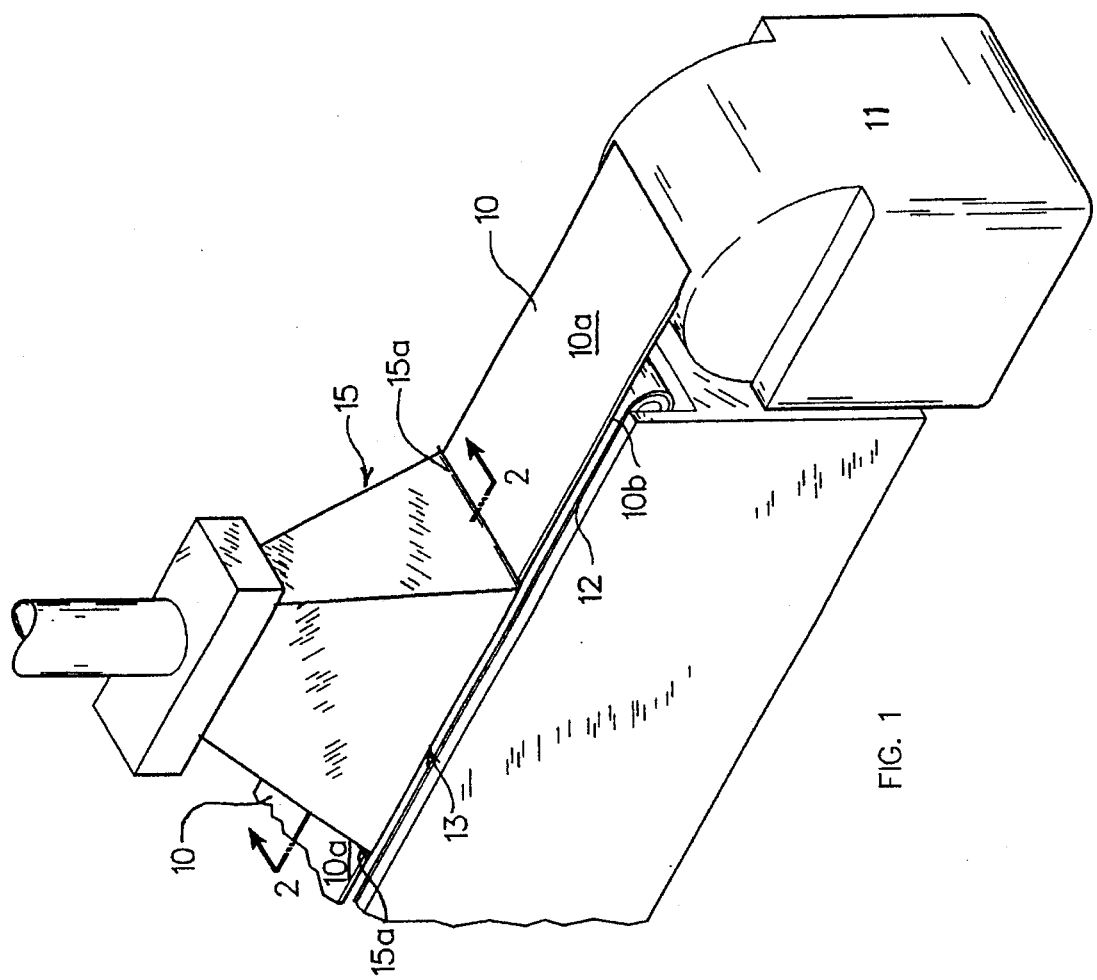
Figure 2:
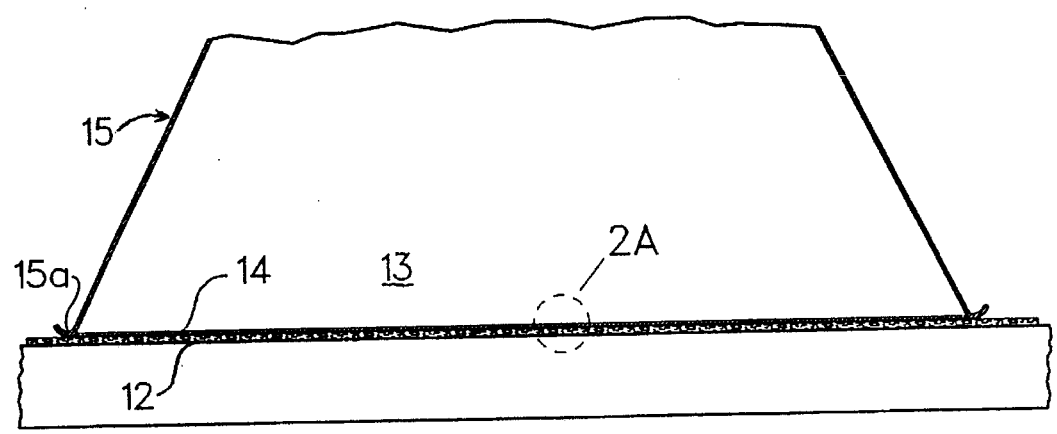
Figure 2A:
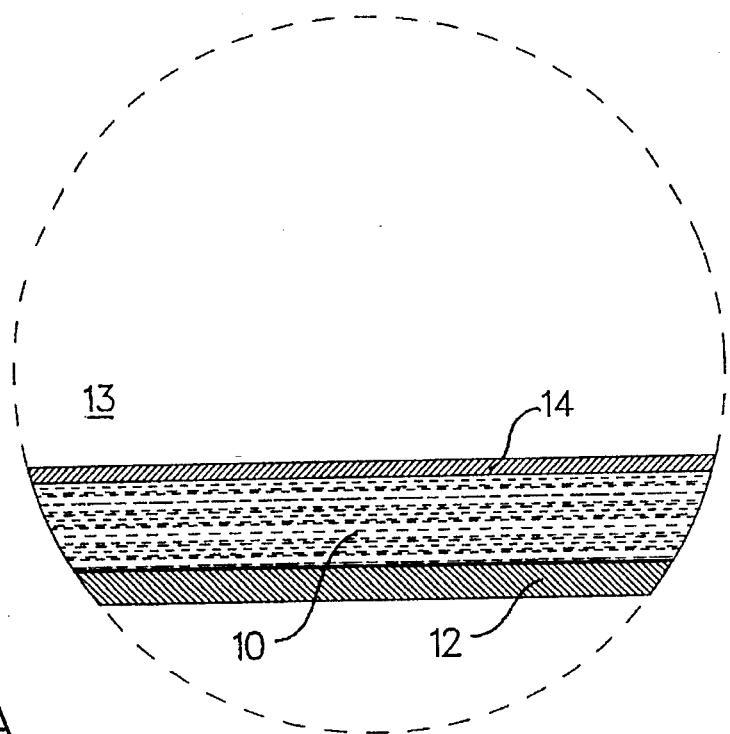

In the embodiment of FIGS. 1 and 2, a continuous, thin, sheet strip 10 of frozen ground meat having substantially smooth upper and lower broad surfaces 10a and 10b, respectively, emerges from a freezing unit 11 and is carried along and supported by an endless belt conveyor 12 in continuous travel to, through, and out of an irradiation zone 13 beneath metal foil anode 14, FIG. 2, constituting the scanning window of a commercially available linear electron beam accelerator 15, such as is obtainable from Radiation Dynamics, Inc., Edgewood, N.Y..

The frozen sheet strip 10 as irradiated can be dealt with on a commercial production basis by cutting and forming into desired product shape in a manner well-known in the art of commercial meat handling. As shown and in accordance with one aspect of the invention, the sheet 10 is in close contact with the anode 14 of the electron beam accelerator 15 as the sheet passes through the irradiation zone 13, the cathode (not shown) of such accelerator being operationally located relative to anode 14 in accordance with the particular make of accelerator concerned. The lower edge margins 15 of accelerator 15 extending transversely to the path of travel of sheet 10 through irradiation zone 13 are preferably of arcuate formation and turned upwardly to facilitate entry and exit of such sheet 10 in close contact with the lower surfaces of foil anode 14. Foil anode 14 is preferably titanium metal and about 5 thousandths of an inch (0.127 millimeters in thickness).

In all instances, the apparatus will be surrounded with thick walls (not shown) of radiation confining material, such as lead, concrete, or a combination of both, to protect operators and bystanders.

Figure 3:
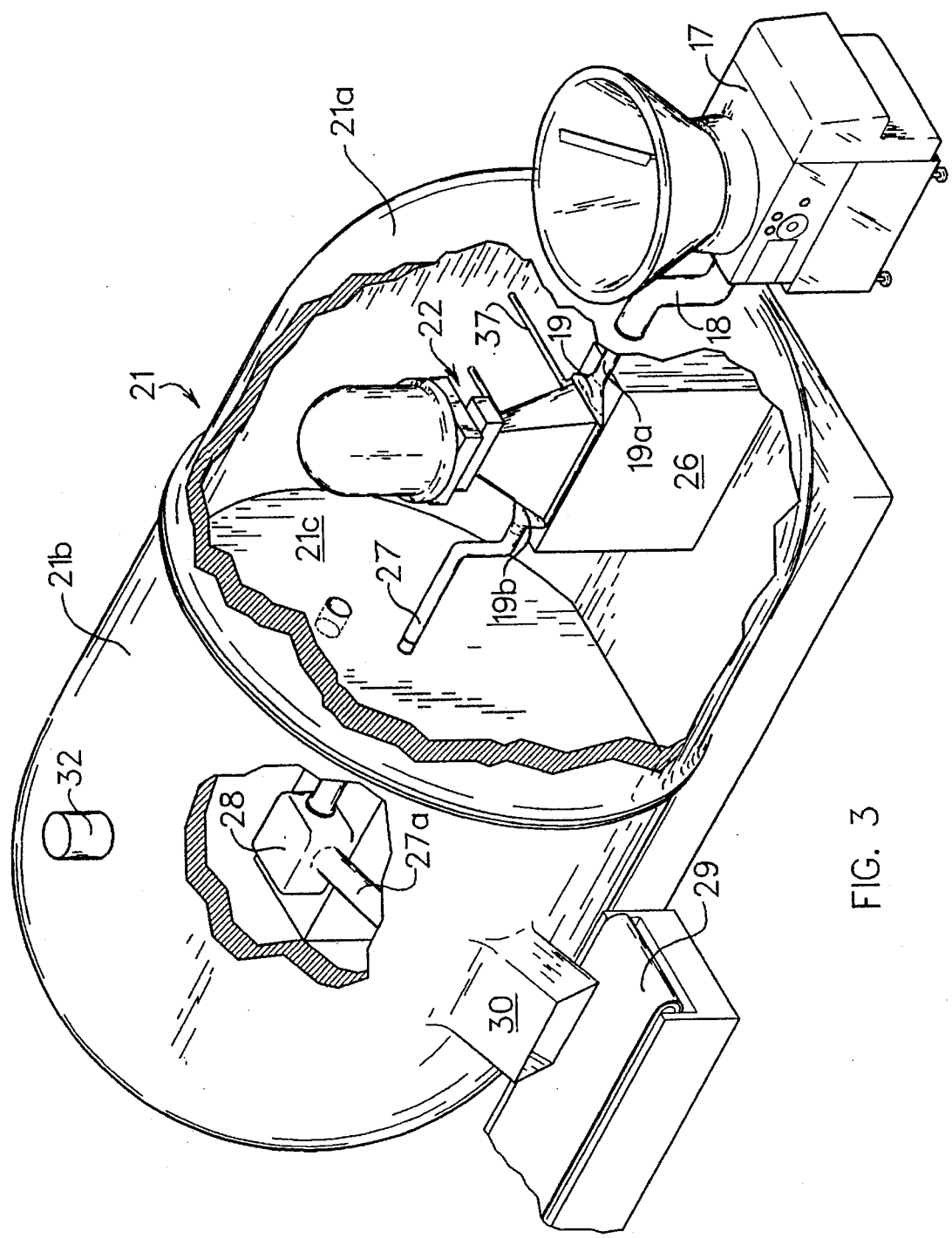

In FIGS. 3 and 4 is shown apparatus for practice of the method again on ground meat. However, a variety of other materials, whether liquid, semi-liquid, or solid, may be processed in this apparatus by appropriate modification where required, which will be obvious to those skilled in mechanical engineering. Here, the ground meat 16, is fed from a grinder 17 into a conduit 18, preferably wrapped with radiation confining material, and then into one end of a manifold 19 having, in this instance, FIGS. 4 and 5, an externally cooled, irradiation chamber 20 for the material 16 to be treated. As shown, manifold 19 is supported within one end portion 21a of an elongate vessel 21 which is divided from an opposite end portion 21b by a dividing wall 21c. Vessel 21 has radiation-confining walls and, as here shown, may rest on a base slab of concrete that provides a floor interiorly of the vessel end portions 21a and 21b.

Manifold 19 provides the anode for a linear electron beam accelerator 22 and is constructed, see FIGS. 4 and 5, to provide, between divergent inflow and convergent outflow pipe ends 19a and 19b, respectively, a relatively thin central portion 19c, which defines, internally thereof, a thin-sheet-forming flow chamber 19d for receiving, from inflow pipe 19a, the material 16 to be irradiated, forming it under entry pressure into a thin sheet, typically eighteen by nine inches by no greater than almost one-half an inch in thickness, and for discharging the irradiated material through outflow pipe 19b. Central portion 19c of manifold 19 has walls 23 and 24 constituting an anode terminal of electron beam accelerator 22 and defining therebetween a cooling chamber 25 for the circulation of a cooling fluid from an inflow nipple 25a to an outflow nipple 25b. Wall 23 of such cooling chamber 25 is thin metal foil as is anode 14 of the prior embodiment.

Linear electron accelerator 22 rests on a support 26 and rises above its anode and the cooling chamber 25 therefor, the cathode (not shown) being operatively associated with the anode as determined by the particular make of accelerator employed. The material 16 to be irradiated flows through irradiation chamber 19d of manifold central portion 19c in direct contact with anode wall 23 before being discharged through convergent outflow pipe 19b into a conduit 27 for delivery through dividing wall 21c of vessel 21 into cutting and product forming equipment 28 within end portion 21b of vessel 21. The finished products discharge through a conduit 27a onto a conveyor belt 29 by way of a chute 30.

Ozone gas resulting from the irradiation flows from linear electron accelerator 22 through a pipe 31 into end portion 20b of vessel 20 and vents to atmosphere through an outlet stack 32.

The material to be irradiated is discharged from grinder 17 under sufficient pressure to force the material entering manifold 19 to form itself into a thin sheet as it passes through flow chamber 19d of such manifold 19.

Figure 6:
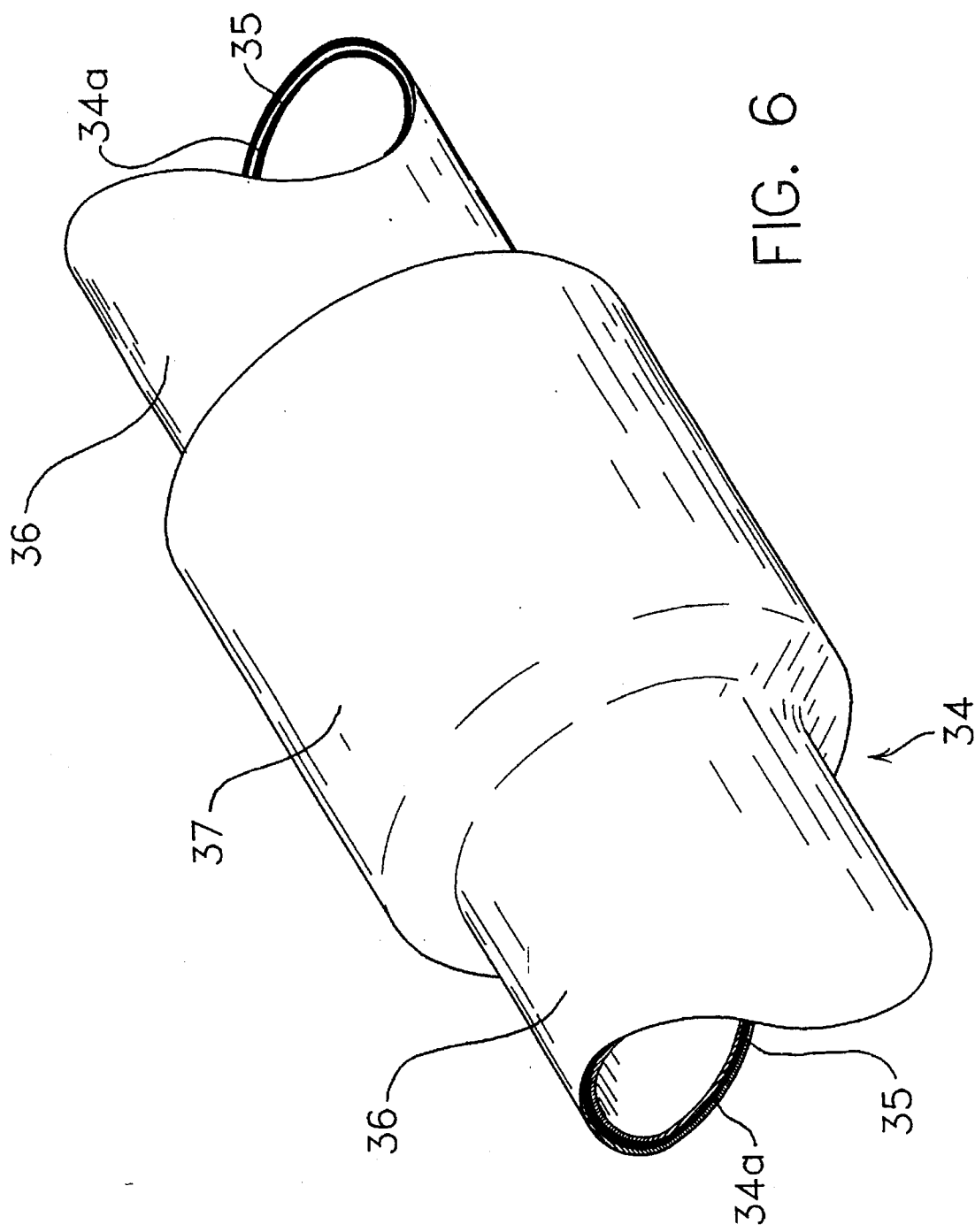

The embodiment of FIG. 6 utilizes a radial diode electron beam accelerator 34. The thin sheet of material 35 is tubular in formation as such material is passed through the anode portion of elongate annular passage 34a of inner tubular member 36 that is surrounded by outer tubular member 37 as the cathode of diode accelerator 34. Such diode accelerator 34 is preferably patterned after that shown in FIG. 4 and described on page 6 of the publication of Sandia Laboratories, Albuquerque, New Mexico, entitled "Radial Electron Beam Laser Excitation, The Reble Report" by Juan J. Ramirez and Kenneth R. Prestwich, except that no laser is associated therewith (This publication is incorporated in entirety herein by reference). A coolant gas may be circulated through the passageway 37 of inner tubular member 36.

Whereas this invention is here illustrated and described with reference to embodiments thereof presently contemplated as the best mode of carrying out such invention in actual practice, it is to be understood that various changes may be made in adapting the invention to other embodiments without departing from the broader inventive concepts disclosed herein and comprehended by the claims that follow.

I claim:

1. A method of utilizing ionizing electron beam radiation from one or more ionizing electron beam diode accelerators having anode and cathode terminals for treating a material, comprising passing the material between the cathode and anode terminals of the one or more electron beam applicators in thin sheet formation and substantially in contact with the anode terminal, the thickness of the sheet being no more than about one-half an inch; and limiting the dosage of the radiation to substantially only that necessary to penetrate the thickness of the sheet and sterilize the material therein.

2. A method according to claim 1, wherein the dosage is about 1.5 kilogray in the range of from about 0.5 to about 2.0 MeV.

3. A method according to claim 1, wherein the material to be irradiated is supplied in sheet formation continuously.

4. A method according to claim 1, wherein the material is in close contact with the anode terminal of the diode during the irradiation.

5. A method according to claim 1, wherein the material to be irradiated is a food material.

6. A method according to claim 5, wherein the material to be irradiated is a meat.

7. A method according to claim 6, wherein the meat material is first ground; and is then placed in sheet formation for irradiation.

8. A method according to claim 1, wherein the electron beam radiation is supplied by at least one radial diode accelerator made up of concentric anode and cathode cylinders, the material to be irradiated being of tubular sheet formation and substantially in contact with the anode as it is being irradiated.

9. A method according to claim 1, wherein the electron beam radiation is supplied by at least one linear electron beam accelerator, the material to be irradiated being in flat sheet form and substantially in contact with the anode terminal or terminals of the electron beam accelerator accelerators as the sheet of material is being irradiated.

10. An apparatus for irradiating a material, comprising one or more ionizing electron beam diode accelerators having anode and cathode terminals; means for forming a material to be irradiated into thin sheet formation; means for passing the sheet of material between the cathode and anode terminals of said one or more accelerators substantially in contact with said anode terminal; and means for limiting the dosage of the radiation to substantially only that necessary to penetrate the thickness of the sheet and sterilize the material therein.

11. An apparatus according to claim 10, wherein the means for placing the material into thin sheet form is a manifold constituting the anode of the electron beam diode generator and having a thin and flat central portion as an irradiation chamber through which the material passes.

12. An apparatus according to claim 11, wherein the manifold contains a cooling chamber surrounding the irradiation chamber and adapted for the circulation of a cooling fluid therethrough.

* * * * *